July 12, 1949.  W. H. LOZON, SR  2,476,202
HAND TRUCK
Filed Feb. 10, 1947

Inventor
William H. Lozon, Sr.

By *Clarence A. O'Brien and Harvey B. Jackson*
Attorneys

Patented July 12, 1949

2,476,202

UNITED STATES PATENT OFFICE 2,476,202

HAND TRUCK

William H. Lozon, Sr., Detroit, Mich.

Application February 10, 1947, Serial No. 727,521

3 Claims. (Cl. 214—82)

This invention relates to new and useful improvements in hand trucks.

The primary feature of the present invention is to provide a truck of the character referred to including means carried by the truck adapted to facilitate easy removal of crates and boxes from the truck.

Another important feature of this invention is to provide a device of the class described on which once the boxes are stacked no additional handling of the boxes is required to remove the boxes in a neatly deposited row.

A further important feature of the present invention is to provide a truck which is adapted to stand in a vertical position when loaded thereby permitting the same to be unloaded at the convenience of the user.

A still further feature of this invention is to provide a device of the character referred to that is strong and durable in construction, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
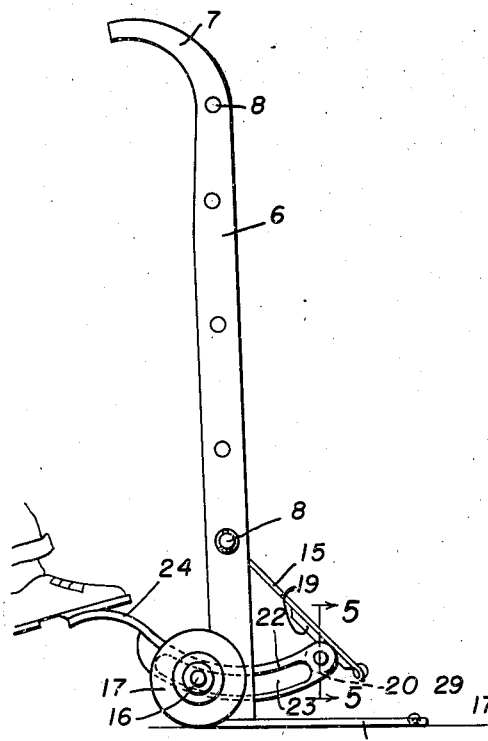
Figure 1 is a side elevational view of the improved truck constructed in accordance with the present invention.
Figure 2:
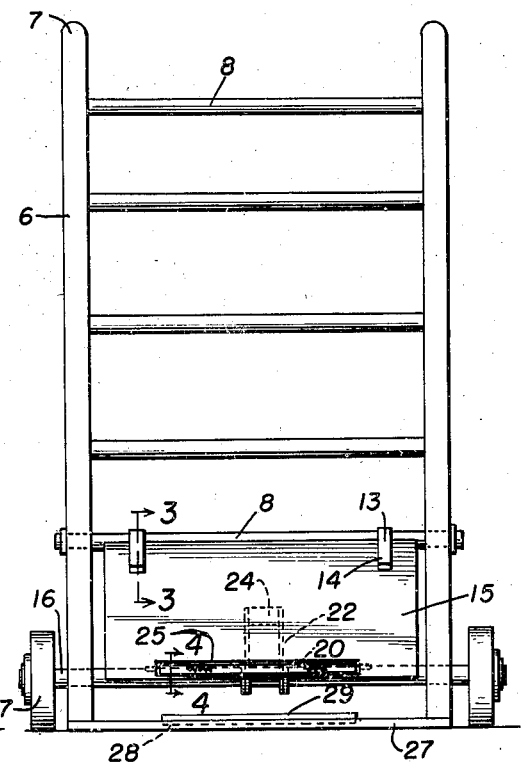
Figure 2 is a front elevational view thereof.
Figure 3:
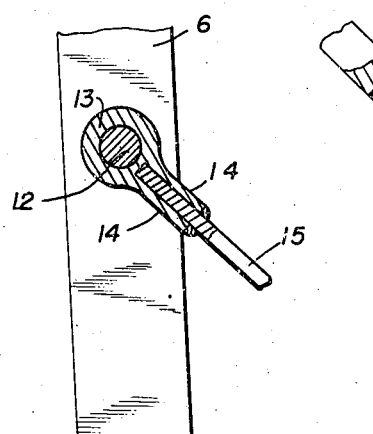
Figure 3 is an enlarged sectional view taken on line 3—3 of Figure 2.
Figure 4:
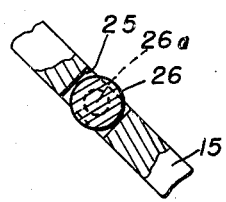
Figure 4 is an enlarged sectional view taken on line 4—4 of Figure 2.
Figure 5:
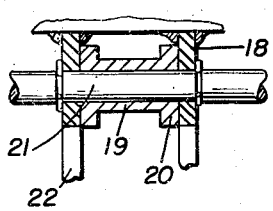
Figure 5 is an enlarged sectional view taken on line 5—5 of Figure 1.

Referring now to the drawings in detail, wherein for the purpose of illustration, I have disclosed a preferred embodiment of the present invention, the numeral 5 represents generally the truck comprising a pair of side rails 6 terminating in handles 7 and interconnected by cross bars 8, the lowermost bar adapted to receive a pair of slip clamps 13 which are journaled for rotation thereon.

Arms 14 projecting outwardly from said clamps are adapted to be secured on either face at the upper end of a swingable panel 15.

At the lower end of side rails 6 is an axle 16 the ends of which project outwardly from the side rails and adapted to receive wheels 17, said wheels being journaled on said axle for rotation.

Suitably secured as at 18 to the inner face of panel 15 is a bearing bracket 19 extending outwardly therefrom and a pin 21 carried by said bracket.

Journaled on said pin 21 are the inner ends of a pair of arcuate arms 22 having arcuate slots 23 therein adapted to receive axle 16 for back and forth motion thereon, whereby panel 15 is swung forwardly and rearwardly.

The outer ends of said arcuate arms 22 are connected together and are integrally formed with a pedal 24 adapted to facilitate easy operation of said arms.

At the free edge of panel 15 is a longitudinal slot 25 in which the outer ends of a shaft 26a are suitably secured. A roller 26 is journaled on the shaft 26a for rotation thereon and projects slightly forward from the face of panel 15 to bear against a box for pushing said box outwardly from a platform 27 carried by the lower ends of side rails 6 and on which the box rests for carrying by the truck.

A longitudinal slot 28 is also provided in the outer edge of platform 27 and adapted to receive a shaft 28, the outer ends of which are suitably secured in said slot.

A roller 29 is journaled on shaft 28 for rotation thereon and projects slightly upwardly from said platform to provide rolling means by which the box is easily rolled off the platform.

In operation the panel 15 is swung inwardly in a vertical position and boxes are stacked on platform 27 for transporting same by the truck.

To unload the boxes the pedal 24 is depressed by the operator's foot as shown in Figure 1 and the swinging panel pushes the boxes outwardly from platform 27.

The respective rollers 26 and 29 aiding the rolling of said boxes while being pushed outwardly and maintained in a neatly stacked position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what I claim as new is:

1. A hand truck comprising a wheeled frame, a supporting platform carried by the lower end of said frame, a swingable panel hingedly connected at its upper edge to said frame, a roller journaled for rotation at the outer edge of said panel, and pedal means connected to said panel for swinging the panel outwardly from the frame, said roller bearing against articles resting on the platform.

2. A hand truck comprising a frame, an axle carried at the lower end of said frame, the outer ends of said axle extending outwardly from adjacent sides of the frame and adapted to receive wheels journaled for rotation on said axle, a supporting platform at the lower end of said frame, a roller journaled for rotation at the outer edge of said platform, said roller projecting upwardly from the platform, a swingable panel hingedly connected at its upper edge to said frame, a roller journaled for rotation at the outer edge of said panel, a bracket extending outwardly from the inner face of said panel, a pair of arcuate arms pivotally connected to said bracket, said arms having arcuate slots adapted for engagement by the axle, and a pedal at the outer ends of said arms integrally formed therewith to provide means for swinging the panel forwardly against articles on the platform for rolling said articles on said first-named roller.

3. A hand truck comprising a wheeled frame including an axle, a supporting platform at the lower end of said frame, a swingable handle hingedly connected at its upper edge to said frame, and pedal means connected to said panel for swinging the panel forwardly from the frame, said pedal means including a forwardly and rearwardly travelling arm riding on the axle and pivoted to the panel.

WILLIAM H. LOZON, Sr.

REFERENCES CITED

The following references are of record in the file of this patent:

UNITED STATES PATENTS

| Number | Name | Date |
|---|---|---|
| 528,443 | Randall | Oct. 30, 1894 |
| 1,556,262 | Streeter | Oct. 6, 1925 |
| 1,710,893 | Phillips | Apr. 30, 1929 |
| 2,240,355 | Swimley | Apr. 29, 1941 |
| 2,360,799 | Slingsby | Oct. 17, 1944 |